United States Patent
Raizer et al.

(10) Patent No.: US 12,155,581 B2
(45) Date of Patent: Nov. 26, 2024

(54) ORCHESTRATION AGENT UNIT AND METHOD THEREIN IN A COMMUNICATIONS NETWORK

(71) Applicant: Telefonaktiebolaget LM Ericsson (publ), Stockholm (SE)

(72) Inventors: Klaus Raizer, Indaiatuba (BR); Ricardo da Silva Souza, Indaiatuba (BR); Amadeu Do Nascimento Junior, Indaiatuba (BR); Jean Paulo Martins, Indaiatuba (BR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/274,297

(22) PCT Filed: Feb. 3, 2021

(86) PCT No.: PCT/EP2021/052488
§ 371 (c)(1),
(2) Date: Jul. 26, 2023

(87) PCT Pub. No.: WO2022/167063
PCT Pub. Date: Aug. 11, 2022

(65) Prior Publication Data
US 2024/0089217 A1   Mar. 14, 2024

(51) Int. Cl.
*G06F 15/16* (2006.01)
*H04L 47/70* (2022.01)
*H04L 47/80* (2022.01)

(52) U.S. Cl.
CPC .......... *H04L 47/803* (2013.01); *H04L 47/822* (2013.01)

(58) Field of Classification Search
CPC .............................. H04L 47/803; H04L 47/822
USPC ......................................................... 709/224
See application file for complete search history.

(56) References Cited

U.S. PATENT DOCUMENTS

| 7,215,663 | B1 * | 5/2007 | Radulovic | H04L 47/15 370/356 |
| 7,672,923 | B1 * | 3/2010 | Reed | H04L 67/104 706/50 |
| 8,077,609 | B2 * | 12/2011 | Gemelos | H04L 47/805 370/235 |

(Continued)

OTHER PUBLICATIONS

International Search Report and Written Opinion of the International Searching Authority, PCT/EP2021/052488, mailed Sep. 30, 2021, 9 pages.

(Continued)

*Primary Examiner* — Moustafa M Meky
(74) *Attorney, Agent, or Firm* — Sage Patent Group (57) ABSTRACT

According to embodiments herein e.g. a method performed by an orchestration agent unit for handling a service in a communications network is provided. The orchestration agent unit evaluate a number of intent types of the service based on a performance of one or more performance metrics related to intent of respective intent type when performed in the communications network including a plurality of orchestration agent units. The orchestration agent unit selects an intent type of the service based on the evaluation; and sends to at least one of the plurality of orchestration agent units, an indication indicating the selected intent type of the service.

16 Claims, 7 Drawing Sheets

(56) References Cited

U.S. PATENT DOCUMENTS

| | | | | |
|---|---|---|---|---|
| 8,582,584 | B2* | 11/2013 | Rieger | H04L 47/70 370/468 |
| 8,589,541 | B2* | 11/2013 | Raleigh | H04W 52/0212 709/224 |
| 8,594,118 | B2* | 11/2013 | Cooper | H04L 43/00 455/452.2 |
| 9,179,359 | B2* | 11/2015 | Raleigh | H04W 28/12 |
| 9,680,767 | B2* | 6/2017 | Karthikeyan | H04L 47/825 |
| 10,637,963 | B2* | 4/2020 | Chan | H04L 47/74 |
| 10,892,958 | B2* | 1/2021 | Bor-Yaliniz | H04L 43/16 |
| 11,025,561 | B2* | 6/2021 | Gopalakrishnan | H04L 47/822 |
| 11,696,184 | B2* | 7/2023 | Tiwari | H04L 41/5025 370/241 |
| 2007/0140113 | A1* | 6/2007 | Gemelos | H04L 47/788 370/465 |
| 2007/0223512 | A1* | 9/2007 | Cooper | H04L 1/206 370/252 |
| 2013/0272121 | A1* | 10/2013 | Stanwood | H04L 47/2475 370/230 |
| 2015/0295856 | A1* | 10/2015 | Karthikeyan | H04L 47/12 370/230 |
| 2018/0375956 | A1* | 12/2018 | Chan | H04L 47/74 |
| 2019/0081907 | A1* | 3/2019 | Gopalakrishnan | H04L 41/0823 |
| 2020/0178093 | A1 | 6/2020 | Peng et al. | |
| 2021/0352534 | A1* | 11/2021 | Tiwari | H04L 41/5009 |
| 2022/0360461 | A1* | 11/2022 | Raleigh | H04W 12/06 |

OTHER PUBLICATIONS

NGMN Alliance, "5G End-to-End Architecture Framework (Phase-3) v4.31," Nov. 12, 2020, 65 pages.

* cited by examiner

ORCHESTRATION AGENT UNIT AND METHOD THEREIN IN A COMMUNICATIONS NETWORK

CROSS REFERENCE TO RELATED APPLICATIONS

This application is a 35 U.S.C. § 371 national stage application of PCT International Application No. PCT/EP2021/052488 filed on Feb. 3, 2021, the disclosure and content of which is incorporated by reference herein in its entirety.

TECHNICAL FIELD

Embodiments herein relate to an orchestration agent unit and a method performed therein in a communications network. Furthermore, a computer program product and a computer readable storage medium are also provided herein. In particular, embodiments herein relate to perform a service in the communications network.

BACKGROUND

In a typical communications network, electronic devices such as wireless terminals, also known as mobile stations and/or user equipments (UEs), communicate packets via e.g. a Radio Access Network (RAN) to one or more core networks (CN). The RAN covers a geographical area which is divided into cell areas, with each cell area being served by a base station, e.g., a radio base station (RBS), which in some networks may also be called, for example, a "NodeB" or "eNodeB". Packets are transported in the communications network such as in the RAN as well as in a Core Network along paths in a transport network.

Cloud computing and processing has become very widely adopted during the past years due to its efficiency, scalability and accessibility in the field of communication. Efficient deployment, configuration and management of increasing amount of deployed applications in cloud environment requires proper usage of orchestration.

5G and the internet of things (IoT) represent the main growth opportunities for communication service providers (CSPs) in the coming decade. To support emerging use cases in these areas, CSPs require business support systems (BSS) that can handle complex business situations and optimize outcomes with minimal manual intervention. Artificial intelligence (AI) may be used, but introducing AI into existing BSS is problematic for a number of reasons. AI-native BSS enable the various applications within the BSS to share business information with each other in an efficient and secure manner—a critical capability in the emerging 5G-IoT world. Most significantly, this evolution requires a layered view of an enterprise's strategic, tactical and operational levels in the BSS, together with the introduction of two new business logic elements such as intents and events. Each layer is responsible for different business intents which can be fanned out on the layer below. A business intent (BI) states the desired or optimal outcome of a given situation, and the different AI capabilities are used to support the realization of the business intents. This disclosure relates to elements of the intent handling and management problem. In a multi-agent scenario, with many autonomous agents performing actions in different parts of the communications network, there will be agents dealing with different types of intents, e.g. key performance indicator (KPI) settings, Natural Language Processing (NLP) input, a goal state, etc. It would be interesting for new agents, which are not formally part of a cognitive layer (CL), to be able to interact with other agents at an appropriate type of intent definition. This might be hard to hardcode a priori due to the large number of agents in the communications network coming from different instances.

SUMMARY

An objective of embodiments herein is to provide a mechanism that enables a handling of services in a communications network that is efficient.

According to a first aspect the objective is achieved by providing a method performed by an orchestration agent unit for handling a service in a communications network. The orchestration agent unit evaluates a number of intent types of the service based on a performance of one or more performance metrics related to intent of respective intent type when performed in the communications network comprising a plurality of orchestration agent units. The orchestration agent unit selects an intent type of the service based on the evaluation, and sends to at least one of the plurality of orchestration agent units, an indication indicating the selected intent type of the service.

It is furthermore provided herein a computer program product comprising instructions, which, when executed on at least one processor, cause the at least one processor to carry out any of the methods above, as performed by the orchestration agent unit. It is additionally provided herein a computer-readable storage medium, having stored therein a computer program product comprising instructions which, when executed on at least one processor, cause the at least one processor to carry out the method according to any of the methods above, as performed by the orchestration agent unit.

According to yet another aspect the objective is achieved by providing an orchestration agent unit for handling a service in a communications network. The orchestration agent unit is configured to evaluate a number of intent types of the service based on a performance of one or more performance metrics related to intent of respective intent type when performed in the communications network comprising a plurality of orchestration agent units. The orchestration agent unit is further configured to select an intent type of the service based on the evaluation, and to send to at least one of the plurality of orchestration agent units, an indication indicating the selected intent type of the service.

Embodiments herein allow orchestration agent units to automatically select the intent type of interaction more appropriate for achieving their goals or intents. This thus results in an improved manner of executing a service in the communications network.

BRIEF DESCRIPTION OF THE DRAWINGS

Embodiments will now be described in more detail in relation to the enclosed drawings, in which.

DETAILED DESCRIPTION

Embodiments herein are described in the context of 5G/NR and LTE but the same concept can also be applied to other wireless communication system such as 4G/LTE and UMTS. Embodiments herein may be described within the context of 3GPP NR radio technology, e.g. using gNB as the radio network node. It is understood, that the problems and solutions described herein are equally applicable to wireless access networks and user equipments (UE) implementing other access technologies and standards. NR is used as an example technology where embodiments are suitable, and using NR in the description therefore is particularly useful for understanding the problem and solutions solving the problem. In particular, embodiments are applicable also to 3GPP LTE, or 3GPP LTE and NR integration, also denoted as non-standalone NR.

Figure 1A:
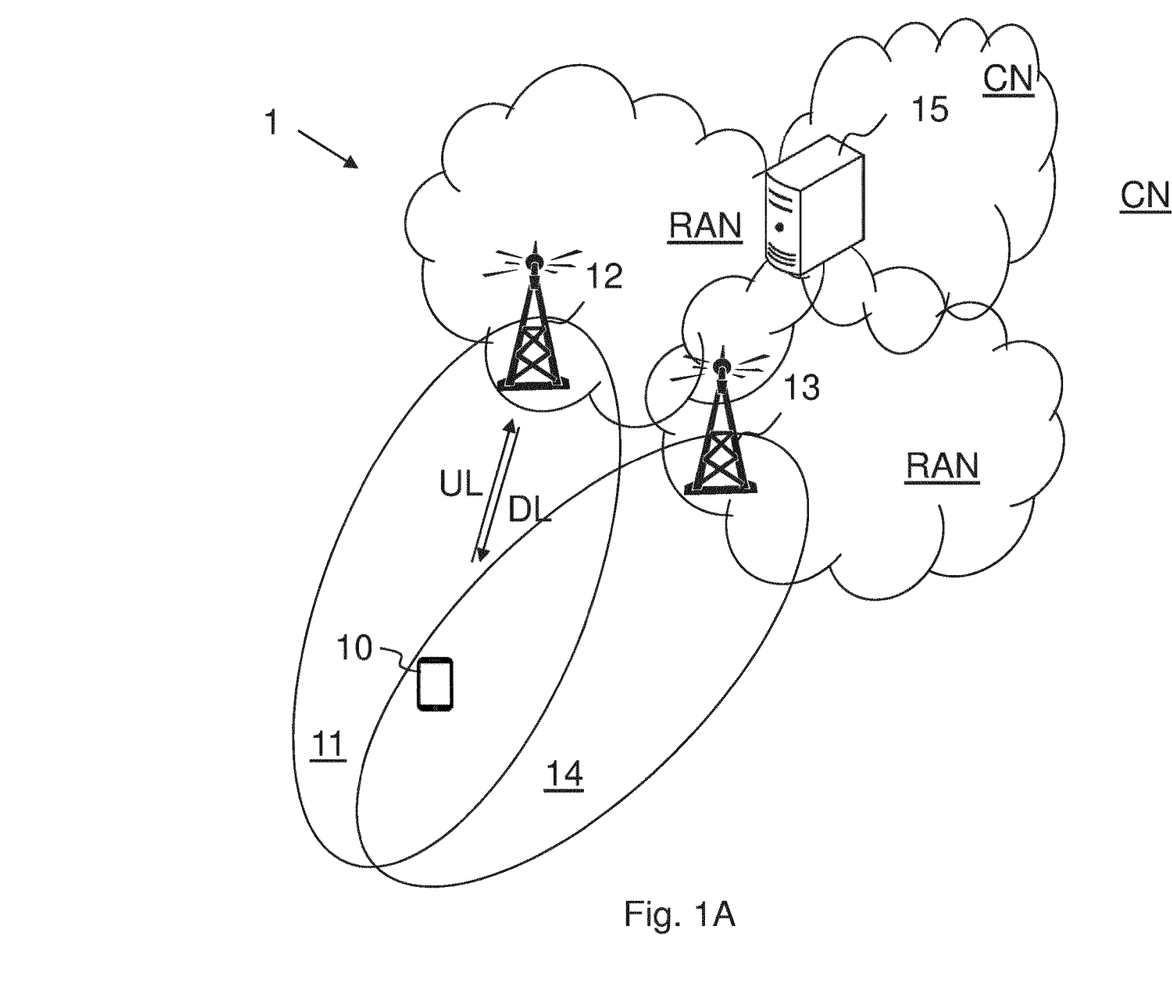
FIG. 1A shows a schematic overview depicting a possible implementation of embodiments herein.

Embodiments herein relate to communications networks in general. FIG. 1A is a schematic overview depicting a communications network 1. The communications network 1 comprises e.g. one or more RANs and one or more CNs. The communications network 1 may use one or a number of different technologies, such as Wi-Fi, Long Term Evolution (LTE), LTE-Advanced, NR, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in 5G systems in combination with LTE, however, embodiments are also applicable in further development of the existing communication systems such as e.g. a WCDMA/LTE system.

In the communications network 1, one or more wireless devices also known as a UE 10 such as a mobile station, a non-access point (non-AP) station (STA), a STA, a wireless device and/or a wireless terminal, communicate via one or more Access Networks (AN), e.g. RAN, to one or more core networks (CN). It should be understood by the skilled in the art that "UE" is a non-limiting term which means any terminal, wireless communication terminal, user equipment, Machine Type Communication (MTC) device, Device to Device (D2D) terminal, internet of things (IoT) operable device, or node e.g. smart phone, laptop, mobile phone, sensor, relay, mobile tablets or even a small base station capable of communicating using radio communication with a network node within an area served by the network node.

The communications network 1 comprises a first radio network node 12 of a first RAN providing e.g. radio coverage over a geographical area, a first service area 11 i.e. a first cell, of a first radio access technology (RAT), such as NR, LTE, Wi-Fi, WiMAX or similar. The first radio network node 12 may herein be referred to as the radio network node and may be a transmission and reception point, a computational server, a base station e.g. a network node such as a satellite, a Wireless Local Area Network (WLAN) access point or an Access Point Station (AP STA), an access node, an access controller, a radio base station such as a NodeB, an evolved Node B (eNB, eNodeB), a gNodeB (gNB), a base transceiver station, a baseband unit, an Access Point Base Station, a base station router, a transmission arrangement of a radio base station, a stand-alone access point or any other network unit or node depending e.g. on the radio access technology and terminology used. The first radio network node 12 may alternatively or additionally be a controller node or a packet processing node or similar. The first radio network node 12 may be referred to as source access node or a serving network node wherein the first service area 11 may be referred to as a serving cell, source cell or primary cell, and the first radio network node communicates with the UE 10 in form of DL transmissions to the UE 10 and UL transmissions from the UE 10. The first radio network node 12 may be a distributed node comprising a baseband unit and one or more remote radio units.

The communications network 1 comprises a second radio network node 13 on a second RAN providing e.g. radio coverage over a geographical area, a second service area 14 i.e. a second cell, of a second radio access technology (RAT), such as NR, LTE, Wi-Fi, WiMAX or similar. The second radio network node 13 may be a transmission and reception point, a computational server, a base station e.g. a network node such as a satellite, a Wireless Local Area Network (WLAN) access point or an Access Point Station (AP STA), an access node, an access controller, a radio base station such as a NodeB, an evolved Node B (eNB, eNodeB), a gNodeB (gNB), a base transceiver station, a baseband unit, an Access Point Base Station, a base station router, a transmission arrangement of a radio base station, a stand-alone access point or any other network unit or node depending e.g. on the radio access technology and terminology used. The second radio network node 13 may alternatively or additionally be a controller node or a packet processing node or similar. The second radio network node 13 may be referred to as a target access node or a target network node wherein the second service area 14 may be referred to as a target cell or secondary cell, and the second radio network node 13 communicates with the UE 10 in form of DL transmissions to the UE 10 and UL transmissions from the UE 10. The second radio network node 13 may be a distributed node comprising a baseband unit and one or more remote radio units. The second RAT may be the same or different than the first RAT.

It should be noted that a service area may be denoted as cell, beam, beam group or similar to define an area of radio coverage. It should further be noted that the first and second cell may be provided by the same radio network node.

The communications network may further comprise a network node 15, e.g. an access & mobility management function (AMF) node, a mobile mobility entity (MME), an operation, administration and management (OAM) node, or a network node handling mobility of UEs or operations in a cell in the communications network.

Embodiments herein relate to implementation of a cognitive layer that aims to reach an intent with many autonomous agent units performing actions in different parts of the communications network. In the current implementation of a Cognitive Layer (CL), each CL instance is like an orchestration agent unit in the communications network that receives Business Intents (BI). BIs are currently defined as e.g. desired KPI values. But more generally, BIs, also referred to as just intents, can be of different types, e.g. KPIs, goal states, desired behaviors, or NLP inputs. Each orchestration agent unit has a set of agent units at its disposal, which are coordinated in order to reach the desired intent. Intent means what we expect the automated network to provide, and that could be conveyed in many different ways.

Each "type" here is one example of a way that we can convey to the CL what we expect. This CL is called cognitive because it makes use of computational mechanisms inspired in cognitive science, such as reasoning, learning, memory and knowledge representation, organized in a synergistic manner. It is a layer because it is built in such a way that it can be added to a network software stack and become responsible for managing and controlling network functions. An example with the KPI type of intents is the following. Imagine the specific case of a customer of a conversational video who would like a good enough service level, the operator then inputs a KPI type intent into the CL stating that "80% of the users should get at least a 'good' quality of experience". The CL then reasons that, in order to achieve this KPI, it must activate an orchestration agent unit to actually deploy the network and its elements. And then activate an agent unit, that will monitor quality of experience (QoE) and adjust the quality of service configuration, to achieve but not overshoot, the goal.

Embodiments herein deal with the broader scenario where there are multiple orchestration agent units ($A_i^{CL}$) spread across the communications network, and each orchestration agent unit may receive different types of intents as input. Moreover, there can be a population of external agent units ($A_i^E$), which are not part of any CL, that will be acting on the communications network and are expected to interact with existing orchestration agent units. An orchestration agent unit may be comprised in the network node 15 or any radio network node.

Figure 1B:
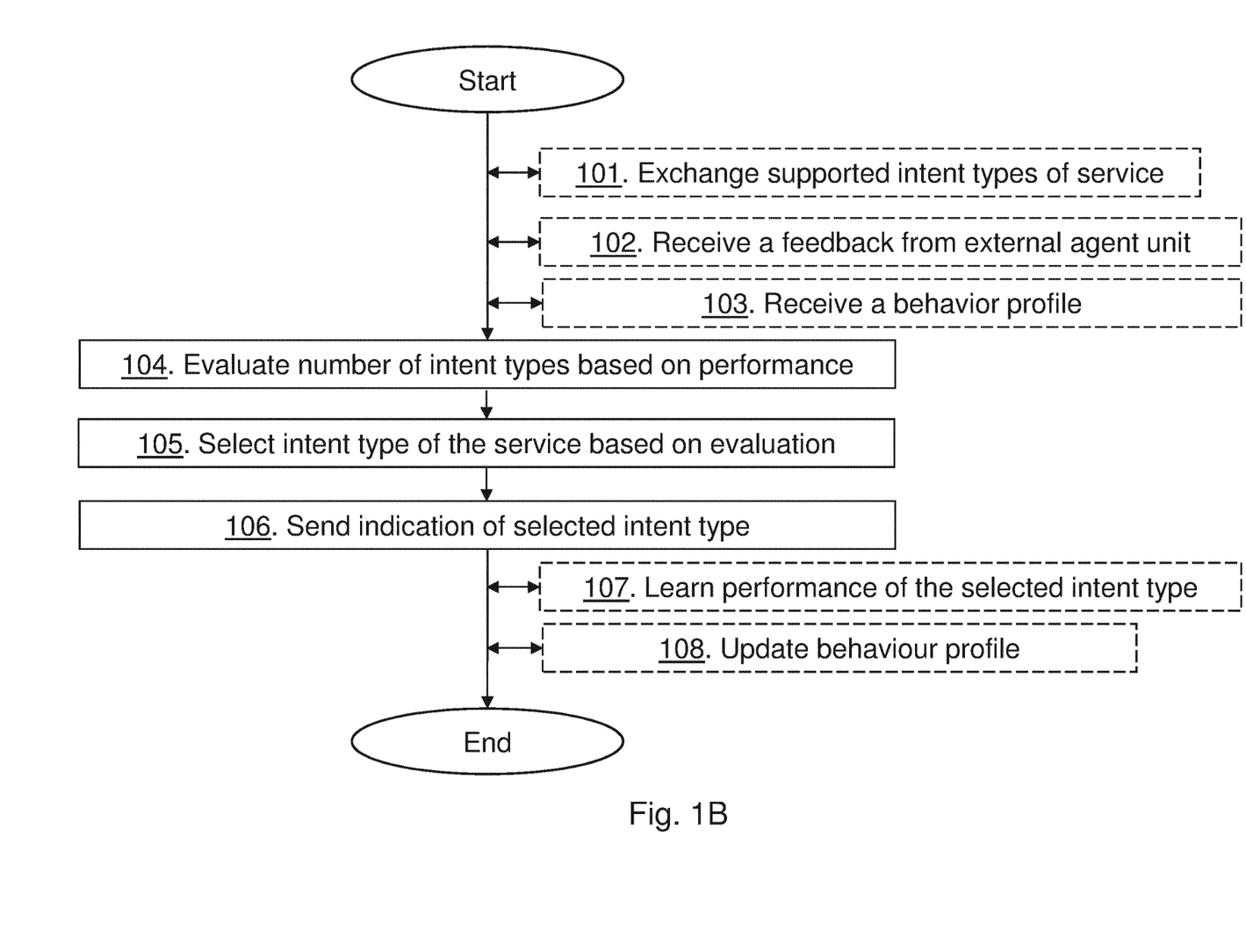
FIG. 1B shows a schematic flowchart depicting a method performed by an orchestration agent unit according to embodiments herein.

The method actions performed by the orchestration agent unit $A_i^{CL}$ for handling a service in the communications network according to embodiments herein will now be described with reference to a flowchart depicted in FIG. 1B. The actions do not have to be taken in the order stated below, but may be taken in any suitable order. Actions performed in some embodiments are marked with dashed boxes.

Action 101. The orchestration agent unit may exchange supported intent types of the service with one or more orchestrations agent units in the communications network.

Action 102. The orchestration agent unit may receive a feedback from an external agent unit, wherein the feedback relates to the performance of one or more performance metrics related to an intent.

Action 103. The orchestration agent unit may receive a behavior profile from one or more orchestration agent units. A behavior profile may include performance metrics e.g. indicating how well a particular agent has performed its job at fulfilling intents given to it. E.g. agent 'a' took 10 seconds to fulfil intent 't', agent 'b' failed at fulfilling intent 'u', agent 'c' provides on average high quality predictions when given intent 'v' and data 'd'.

Action 104. The orchestration agent unit evaluates a number of intent types e.g. KPI values or NLP inputs, of the service based on a performance of one or more performance metrics, e.g. throughput, related to intent, e.g. QoE, of respective intent type when performed in the communications network comprising a plurality of orchestration agent units. The one or more performance metrics may be weighted differently according to predefined preferences. The orchestration agent unit may take the feedback, see action 102, into account during evaluation of the number of intent types. The orchestration agent unit may use the received behavior profile during evaluation.

Action 105. The orchestration agent unit selects an intent type of the service based on the evaluation. The orchestration agent unit may select the intent type of the service by analyzing a Pareto frontier and select an intent type that is non-dominated that fit a performance. E.g. an analysis of dominance and, therefore, the "discovery" of the pareto frontier works as a way to determine the possible candidates. For instance, if only one intent type is on the frontier, that is, completely dominates all other possibilities, no matter the preferences, that is the best Intent-type. Other "ranking" methods may also be used following other criteria, and the Pareto frontier is herein used as an example of such "ranking system". In another example, if preferences, i.e. weights, for performance metrics were given, then one may compute the weighted sum of the performance measurements for each intent-type, and may select the intent-type with highest weighted sum. If there are no preferences defined, then select any non-dominated intent-type. Without preferences, all non-dominated intent-types are equivalent regarding performance metrics then there is no way to choose one from another. Without preferences, all non-dominated intent-types are equally good.

Action 106. The orchestration agent unit sends to at least one of the plurality of orchestration agent units, an indication indicating the selected intent type of the service.

Action 107. The orchestration agent unit may learn a performance of the selected intent type of the service based on an outcome of the selected intent type of the service and using this learning in upcoming evaluation and selection, e.g. using a machine learning (ML) model. The orchestration agent unit may take the feedback, see action 102, into account during learning of performances of the number of intent-types.

Action 108. The orchestration agent unit may update the behavior profile based on a performance of the selected intent type of the service.

Figure 2:
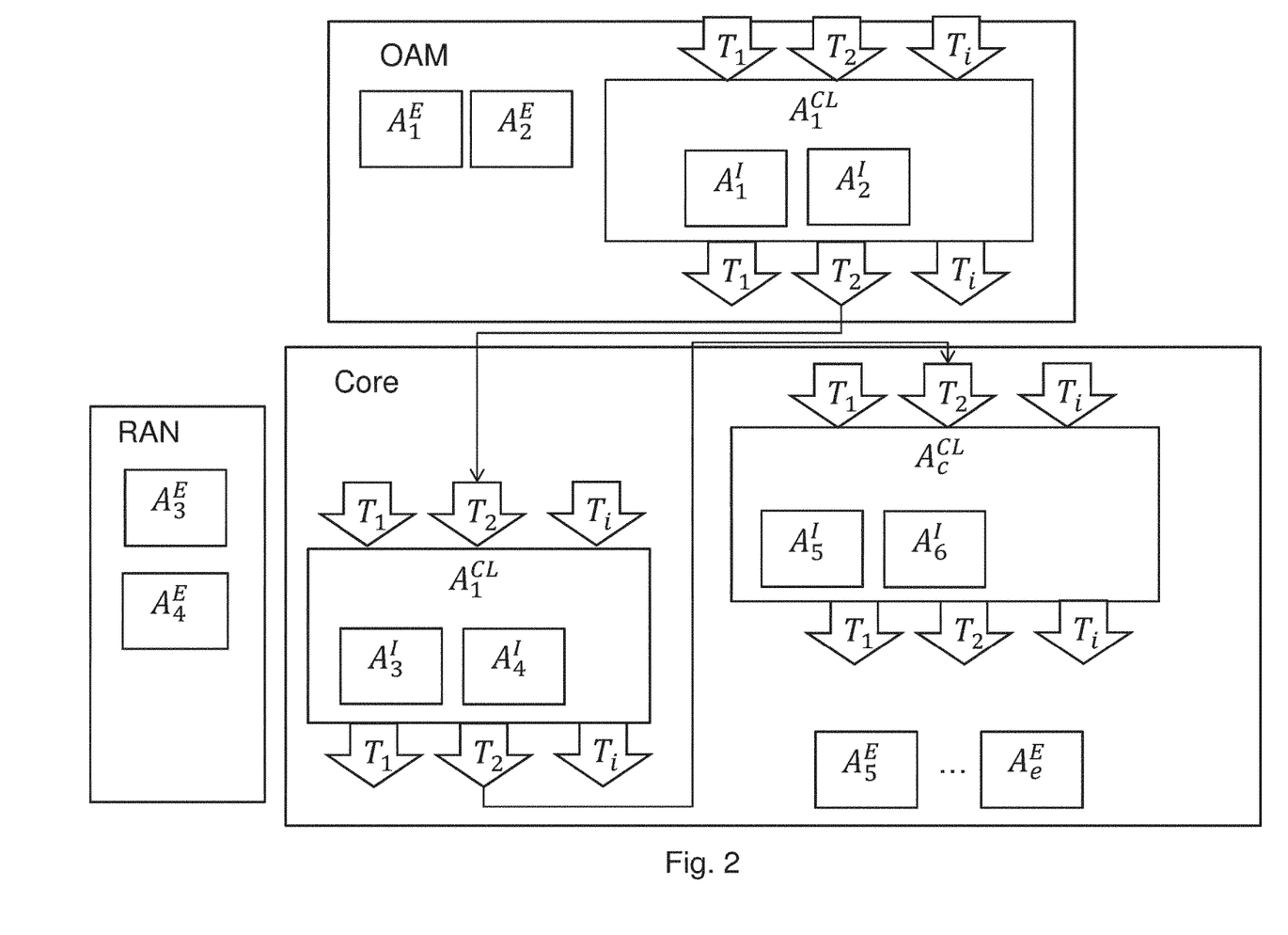
FIG. 2 shows a block diagram illustrating embodiments herein.

FIG. 2 shows agent units distributed across the communications network. These agent units can be cognitive layer (CL) agents, $A_i^{CL}$, internal agent $A_i^I$ to a cognitive agent, or independent external agents $A_i^E$. The orchestrations agent units are herein denoted as CL agents.

An example scenario is shown in FIG. 2. A first CL agent $A_1^{CL}$, i.e. implemented with the Cognitive Layer, receives a business-level intent of type $T_1$. This CL agent will come up with a plan to address this intent, which will include its internal agents $A_i^I$ but might also require the help of other CL agents instantiated at different locations of the communications network, e.g. $A_2^{CL}$ and $A_c^{CL}$. 'c' stands for number of CL agents. The challenge now is to choose what type of intents the first CL agent $A_1^{CL}$, should choose to send to CL agents $A_2^{CL}$ and $A_c^{CL}$.

According to prior art a cognitive loop for a Cognitive Layer Agent ($A_{CL}(1)$) that receives a business intent, reasons the sequence of activation for its internal agents, e.g. A(1,1 . . . 3), and activates them according to plan. In this case, exchange of intent between CL agents is not necessary.

The technical effect of embodiments herein is to enable the orchestration agent unit also known as CL agent to select the best intent type to be transmitted to a receiver CL agent. Our proposed method is comprised of a number of components: Evaluation, Selection and/or Learning/update.

Consider M performance metrics with performance value $\rho_k$, with k=1, . . . , M. The effectiveness of an intent type $T_i$ to communicate a task to an agent unit A is defined by an M-dimensional vector $\rho_{T_i}^A=(\rho_1, \ldots, \rho_M)$. In practice, those performance metrics evaluate the success of agent unit A when a task is communicated through an intent-type $T_i$. The success rate of an agent unit A, the average time it takes to finish, and the average gap to the fulfillment target, are examples of performance metrics.

From the notion of e.g. Pareto-dominance, one may state that dominating intent-types $\rho_{T_i}^A \leq \rho_{T_j}^A$, are the preferred way to communicate with the agent unit A. An intent-type $T_i$ Pareto-dominates other $T_j$ if it is not worse than the other in any performance score $\rho_k$ and it is better in at least one performance metric. There are relaxed versions of this criterion that also could be employed, herein we use the term "non-dominated" to refer to any of such criteria.

When a first agent unit A decides to request a second agent unit B to perform a task, the first agent unit A may decide which intent-type to utilize in order to guarantee the task will be fulfilled in time and with a proper level of success. Therefore, the first agent unit A observes the estimated performances of B's intent-types' and by analyzing e.g. the Pareto frontier choose one among those that are non-dominated that best fit the needs (intent) of agent unit A.

Figure 3:
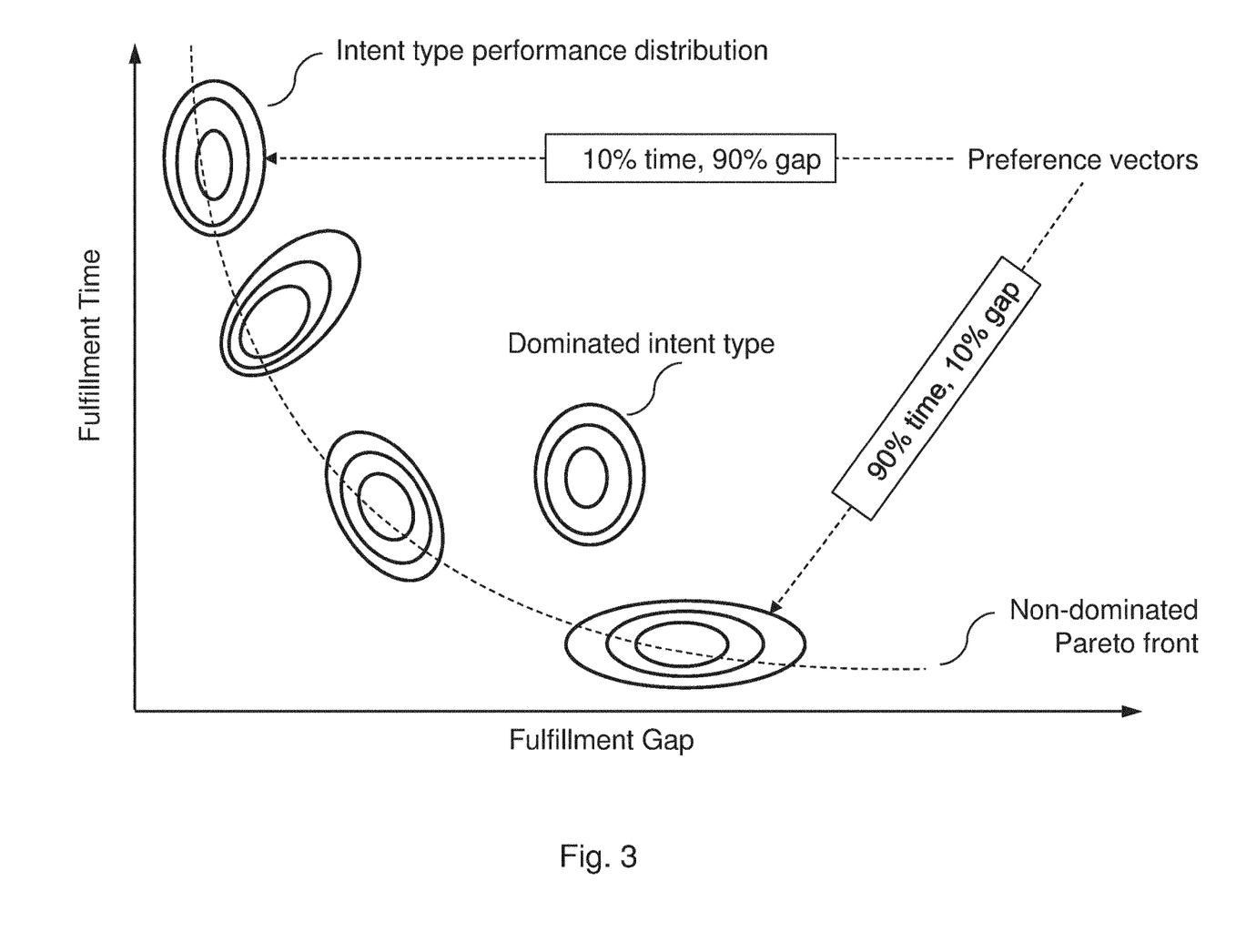
FIG. 3 shows a diagram using a preference vector to indicate a preferred intent-type.

FIG. 3 shows that when all performance metrics are considered, non-dominated intent-types are equivalent, but given a preference vector, some intent-types are preferred.

If the agent unit A has explicit preference for some of the performance estimates, this should be specified as a preference vector, prior to the intent-type selection. A preference vector $x \in \mathbb{R}^M$ indicates the interest for each performance metric, such that $\Sigma_{k=1}^M x_k = 1$. It can be employed to aggregate the performance metric estimates of all intent-types $T_i$ $$Pref_A(T_i, \rho_{T_i}^B) = \sum_{k=0}^M x_k \rho_{T_i}^B(k) \quad (1)$$

The values $Pref_A(T_i, \rho_{T_i}^B)$ regarding all intent-types allow the agent unit A to evaluate, according to its own preferences, the performance estimates of the agent unit B. Since these values are now unidimensional, it is easy to employ them to decide which intent-type is best for achieving the goals of agent unit A. After using the preferences to aggregate the intent types performances scores, each intent type is represented only by one real value, instead of several (M) real values. The intent types can then be ranked by their aggregated performance scores, and the intent type with the highest value be chosen. Ranking works if the values are unidimensional. That is the reason why, for generality, we propose the use of preferences to aggregate the multiple performance metrics. If no preferences are available, good intent types can still be selected among the non-dominated.

Notice that, before aggregating the performance values or scores e.g. provided as input (by the requesting agent), the performance metrics should first be normalized and converted to the same direction in the objective space, i.e. they all should be maximized or minimized (consider that max $f(x) = \min -f(x)$).

In the proposed solution, an agent unit uses performance metrics such as performance values $\rho_k$, with $k=1, \ldots, M$ (where M is the number of performance metrics) from other agent units to decide how to interact with that entity. These performance values are kept within the agent unit they represent and may be updated either by the agent unit itself or by any external agent unit that uses that business intent to trigger interactions.

Figure 4:
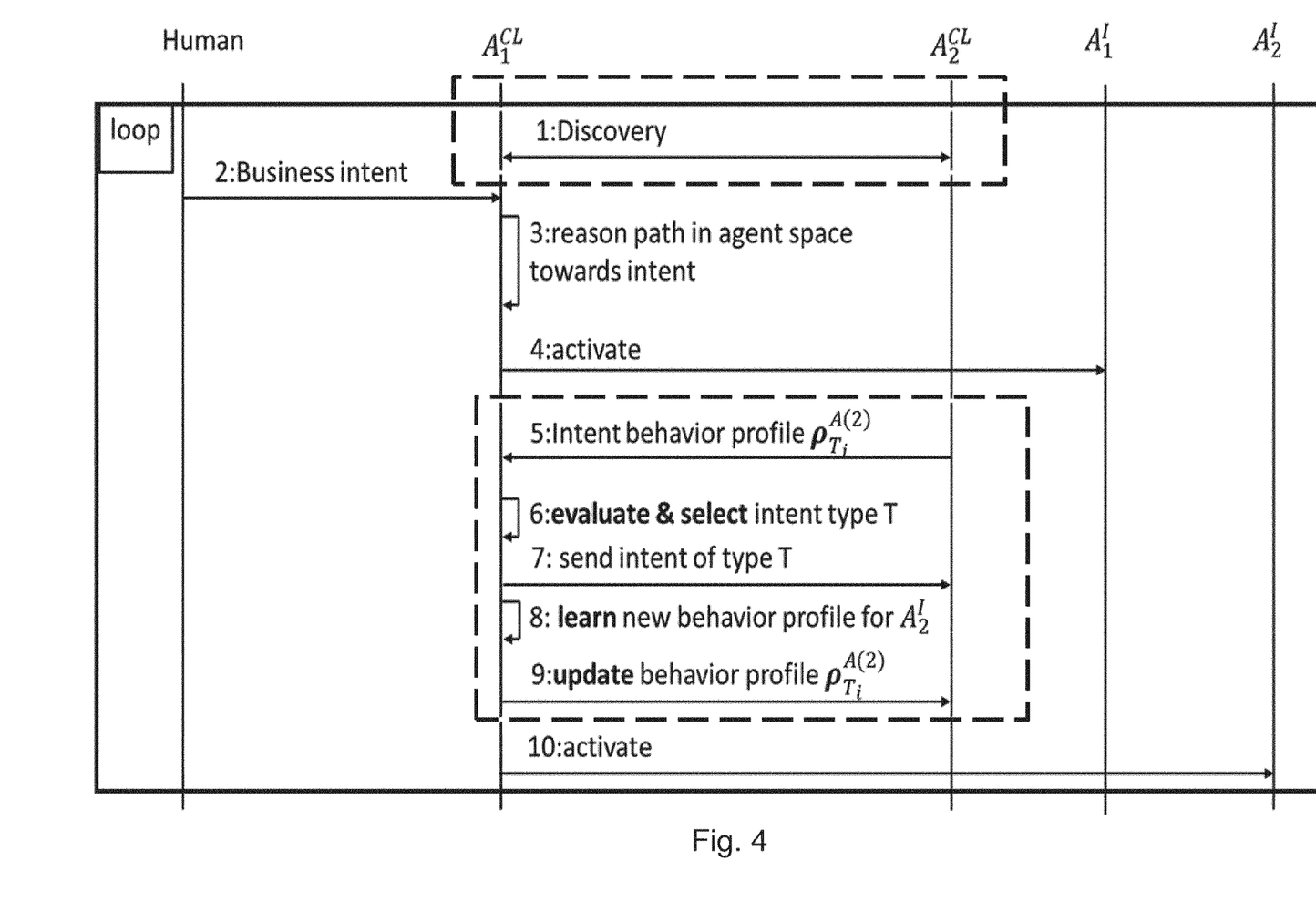
FIG. 4 shows a signaling scheme depicting some embodiments herein.

FIG. 4 shows an end-to-end sequence diagram illustrating the method, with novelty actions of the method marked in the dashed boxes. It requires a discovery mechanism/protocol (1) so that orchestration agent units can discover each other and exchange metadata, e.g. supported intent types, internal agents' capabilities. Then, the orchestration agent unit, e.g. $A_1^{CL}$, receives a business intent (2) and reasons the sequence (3) in which a collection of agent units must be activated in order to fulfill the given intent. Some of these agent units are internal $A_i^I$ to $A_1^{CL}$, and can be activated as needed (4). Other agents, e.g. $A_2^{CL}$, are orchestration agent units themselves, and may receive instructions in the form of intents. The method proceeds with a second orchestration agent unit $A_2^{CL}$ providing its intent behavior profile (5) to the first orchestration agent unit $A_1^{CL}$. The first orchestration agent unit $A_1^{CL}$ then proceeds to evaluate (6) and to select the best intent type T, as described above. It sends (7) the intent to the second orchestration agent unit $A_2^{CL}$, and, based on its performance, learns (8) a new behavior profile for the second orchestration agent unit $A_2^{CL}$, and updates (9) the new behavior profile for the second orchestration agent unit $A_2^{CL}$. The learn and update mechanism will be further detailed in FIG. 5. The first orchestration agent unit $A_1^{CL}$ may then active another internal agent unit (10).

Figure 5:
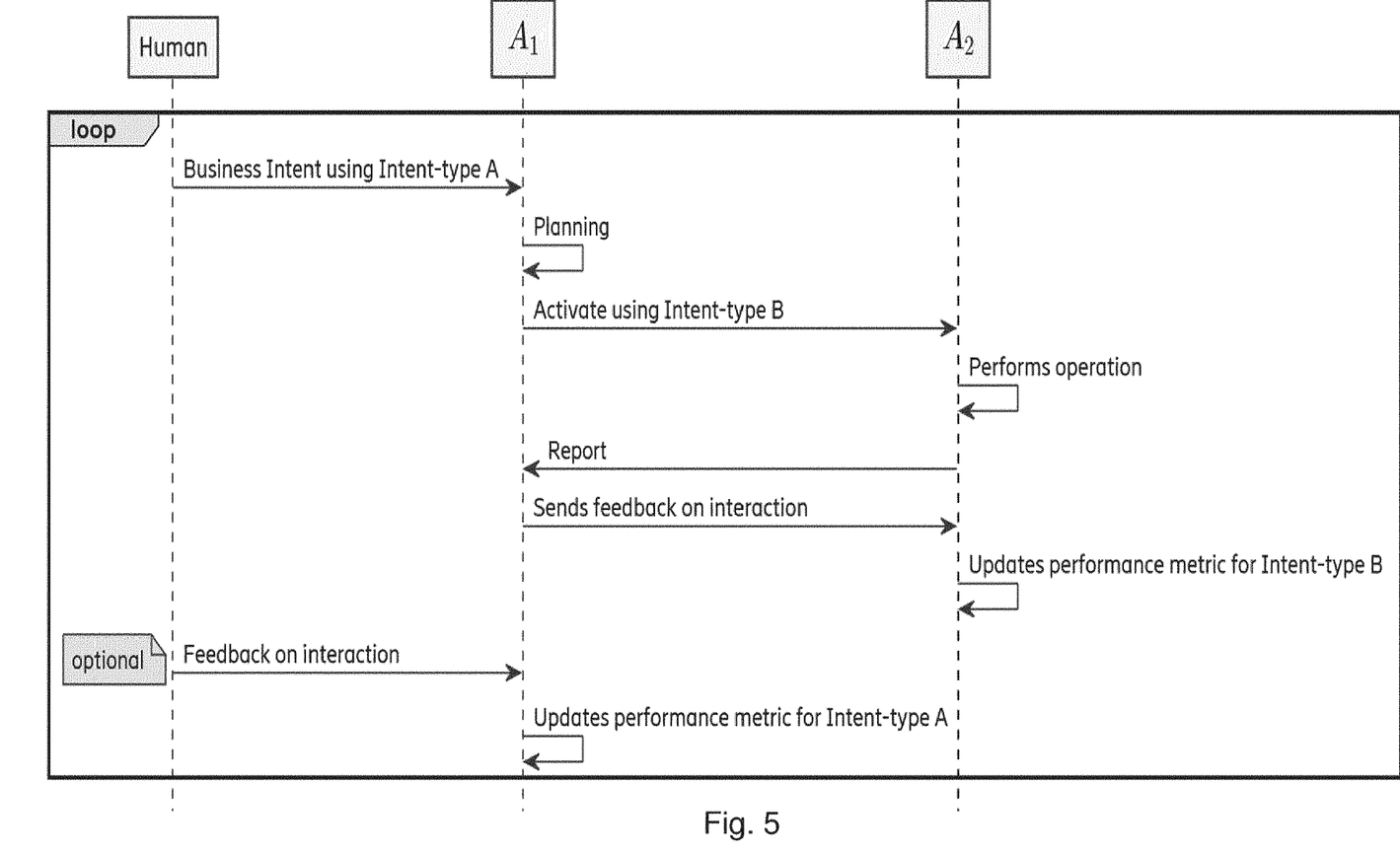
FIG. 5 shows a signaling scheme depicting some embodiments herein.

FIG. 5 illustrates the flow when the performance metric may be updated by an external agent unit, as described above. In this example, both first orchestration agent unit $A_1$ and second orchestration agent unit $A_2$ represent instances of a cognitive layer and have already gone through the discovery process. Following the described selection process, $A_1$ trigger an interaction with $A_2$ using intent-type B and, based on the result of that interaction, $A_1$ sends a feedback to $A_2$ and, analogous to a reward signal in reinforcement learning, this feedback is used to update the intent type performance metric. This feedback signal can be calculated using several different information, e.g. fulfilment rate, fulfilment gap (in unsuccessful cases), time to completion/convergence, etc. Finally, $A_1$ also updating its internal performance metric for Intent-type A. This final update could also take in consideration a feedback coming from the human operator, as indicated as optional on the sequence diagram.

Figure 6:
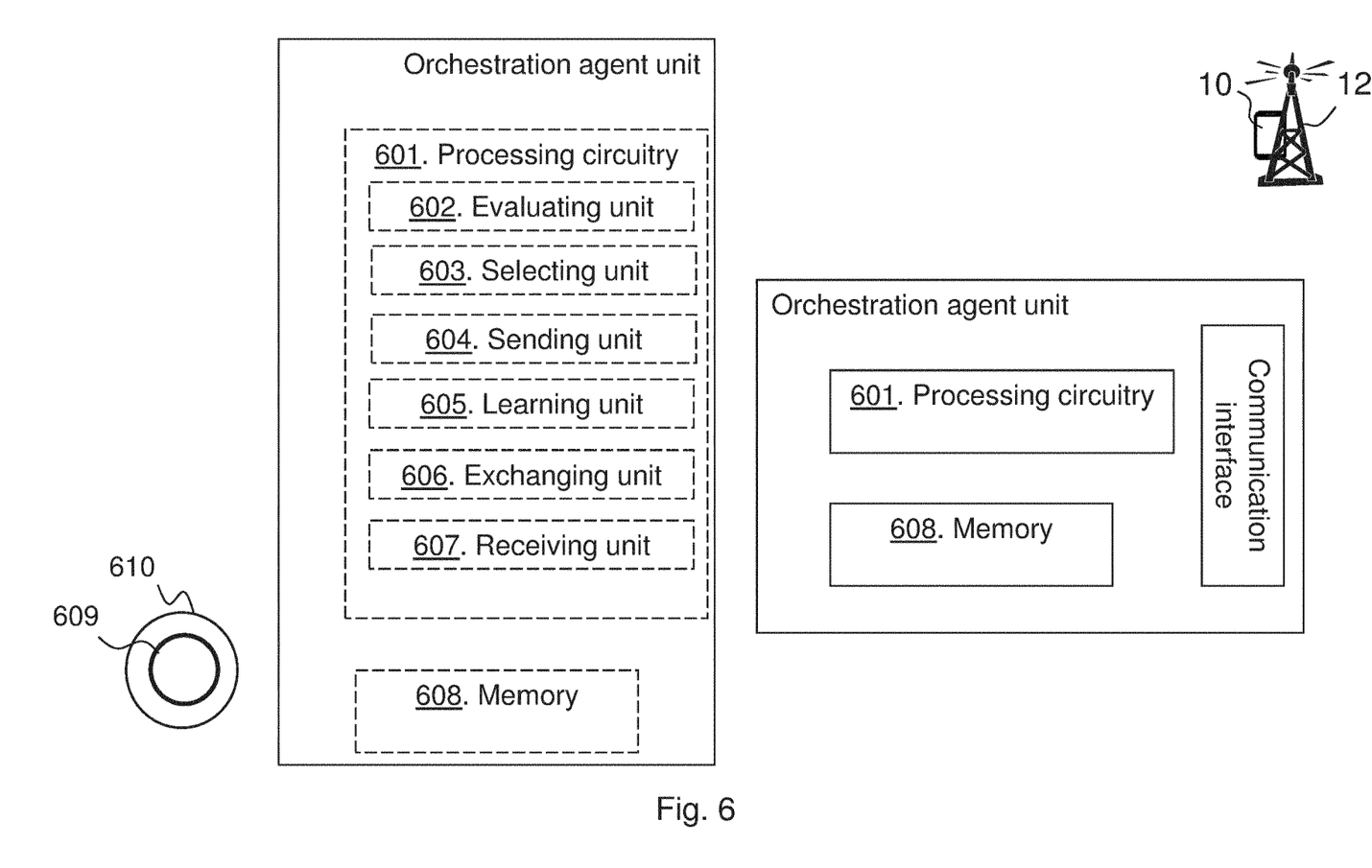
FIG. 6 is a block diagram depicting an orchestration agent unit according to embodiments herein.

Embodiments herein provide the orchestration agent unit configured to perform the methods described above. FIG. 6 discloses the orchestration agent unit for managing a service in the communications network 1 in a block diagram manner in two embodiments.

The orchestration agent unit comprised e.g. in the network node 15 such as an OAM node, core network node or similar, may comprise processing circuitry 601, e.g. one or more processors, configured to perform the methods herein.

The orchestration agent unit may comprise an evaluating unit 602. The orchestration agent unit, the processing circuitry 601 and/or the evaluating unit 602 is configured to evaluate a number of intent types e.g. KPI values or NLP inputs, of the service based on a performance of one or more performance metrics, e.g. throughput, related to intent, e.g. QoE, of respective intent type when performed in the communications network comprising a plurality of orchestration agent units. The one or more performance metrics may be weighted differently according to predefined preferences. The orchestration agent unit, the processing circuitry 601 and/or the evaluating unit 602 may be configured to take the feedback into account during evaluation of the number of intent types. The orchestration agent unit, the processing circuitry 601 and/or the evaluating unit 602 may be configured to use the received behavior profile during evaluation.

The orchestration agent unit may comprise a selecting unit 603. The orchestration agent unit, the processing circuitry 601 and/or the selecting unit 603 is configured to select an intent type of the service based on the evaluation. The orchestration agent unit, the processing circuitry 601 and/or the selecting unit 603 may be configured to select the intent type of the service by analyzing a Pareto frontier and select an intent type that is non-dominated that fit a performance.

The orchestration agent unit may comprise a sending unit 604. The orchestration agent unit, the processing circuitry 601 and/or the sending unit 604 is configured to send to at least one of the plurality of orchestration agent units, the indication indicating the selected intent type of the service.

The orchestration agent unit may comprise a learning unit 605. The orchestration agent unit, the processing circuitry 601 and/or the learning unit 605 may be configured to learn a performance of the selected intent type of the service based on an outcome of the selected intent type of the service and using this learning in upcoming evaluation and selection, e.g. using a machine learning (ML) model. The orchestration agent unit may The orchestration agent unit may comprise an exchanging unit 606. The orchestration agent unit, the processing circuitry 601 and/or the exchanging unit 606 may be configured to exchange supported intent types of the service with one or more orchestrations agent units in the communications network.

The orchestration agent unit may comprise a receiving unit 607. The orchestration agent unit, the processing circuitry 601 and/or the receiving unit 607 may be configured to receive a feedback from an external agent unit, wherein the feedback relates to the performance of one or more performance metrics related to an intent. The orchestration agent unit, the processing circuitry 601 and/or the learning unit 605 may be configured to take the feedback, into account during learning of performances of the number of intent-types.

The orchestration agent unit, the processing circuitry 601 and/or the receiving unit 607 may be configured to receive a behavior profile from one or more orchestration agent units.

The orchestration agent unit, the processing circuitry 601 and/or the exchanging unit 606 may be configured to update the behavior profile based on a performance of the selected intent type of the service.

The orchestration agent unit further comprises a memory 608. The memory comprises one or more units to be used to store data on, such as intent, intent types, performance metrics, behavior profiles, performance, applications to perform the methods disclosed herein when being executed, and similar. Thus, the orchestration agent unit may comprise the processing circuitry and the memory, said memory comprising instructions executable by said processing circuitry whereby said orchestration agent unit is operative to perform the methods herein. The orchestration agent unit may comprise a communication interface comprising a transmitter, a receiver, a transceiver and/or one or more antennas.

The methods according to the embodiments described herein for the orchestration agent unit are respectively implemented by means of e.g. a computer program product 609 or a computer program, comprising instructions, i.e., software code portions, which, when executed on at least one processor, cause the at least one processor to carry out the actions described herein, as performed by the orchestration agent unit. The computer program product 609 may be stored on a computer-readable storage medium 610, e.g. a disc, a universal serial bus (USB) stick, or similar. The computer-readable storage medium 610, having stored thereon the computer program product 609, may comprise the instructions which, when executed on at least one processor, cause the at least one processor to carry out the actions described herein, as performed by the orchestration agent unit. In some embodiments, the computer-readable storage medium may be a non-transitory or a transitory computer-readable storage medium.

Alternatively, several of the functional elements or units of the processor/s or processing circuits discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the embodiments herein are limited only by the following claims and their legal equivalents.

The invention claimed is:

1. A method performed by an orchestration agent unit for handling a service in a communications network, the method comprising:
    evaluating a number of intent types of the service based on a performance of one or more performance metrics related to intent of respective intent type when performed in the communications network comprising a plurality of orchestration agent units;
    selecting an intent type of the service based on the evaluation; and
    sending to at least one of the plurality of orchestration agent units, an indication indicating the selected intent type of the service.

2. The method according to claim 1, further comprising learning a performance of the selected intent type of the service based on an outcome of the selected intent type of the service and using this learning in upcoming evaluation and selection.

3. The method according to claim 1, further comprising receiving a behavior profile from one or more orchestration agent units and using this behavior profile during evaluation, and updating the behavior profile based on a performance of the selected intent type of the service.

4. The method according to claim 1, wherein selecting the intent type of the service comprises analyzing a Pareto frontier and select an intent type that is non-dominated that fit a performance.

5. The method according to claim 1, wherein the one or more performance metrics are weighted differently according to predefined preferences.

6. The method according to claim 1, further comprising receiving a feedback from an external agent unit, wherein the feedback relates to the performance of one or more performance metrics related to an intent; and taking the feedback into account during evaluation of the number of intent types and/or during learning of performances of the number of intent-types.

7. The method according to claim 1, further comprising exchanging supported intent types of the service with one or more orchestrations agent units in the communications network.

8. A computer program product comprising instructions which, when executed on at least one processor, cause the at least one processor to carry out the method according to claim 1 performed by the orchestration agent unit.

9. A computer-readable storage medium storing a computer program product comprising instructions which, when executed on at least one processor, cause the at least one processor to carry out the method according to claim 1 performed by the orchestration agent unit.

10. An orchestration agent unit for handling a service in a communications network, wherein the orchestration agent unit is configured to:
evaluate a number of intent types of the service based on a performance of one or more performance metrics related to intent of respective intent type when performed in the communications network comprising a plurality of orchestration agent units;
select an intent type of the service based on the evaluation; and
send to at least one of the plurality of orchestration agent units, an indication indicating the selected intent type of the service.

11. The orchestration agent unit according to claim 10, wherein the orchestration agent unit is further configured to learn a performance of the selected intent type of the service based on an outcome of the selected intent type of the service and to use this learning in upcoming evaluation and selection.

12. The orchestration agent unit according to claim 10, wherein the orchestration agent unit is further configured to receive a behavior profile from one or more orchestration agent units and to use this behavior profile during evaluation, and further to update the behavior profile based on a performance of the selected intent type of the service.

13. The orchestration agent unit according to claim 10, wherein the orchestration agent unit is configured to select the intent type of the service by analyzing a Pareto frontier and select an intent type that is non-dominated that fit performance.

14. The orchestration agent unit according to claim 10, wherein the one or more performance metrics are weighted differently according to predefined preferences.

15. The orchestration agent unit according to claim 10, wherein the orchestration agent unit is further configured to receive a feedback from an external agent unit, wherein the feedback relates to the performance of one or more performance metrics related to an intent; and to take the feedback into account during evaluation of the number of intent types and/or during learning of performances of the number of intent-types.

16. The orchestration agent unit according to claim 10, wherein the orchestration agent unit is further configured to exchange supported intent types of the service with one or more orchestrations agent units in the communications network.

* * * * *